US005561847A

United States Patent [19]

Kataoka

[11] Patent Number: 5,561,847
[45] Date of Patent: Oct. 1, 1996

[54] RADIO COMMUNICATION SYSTEM REPRESENTED BY MICRO CELLULAR SYSTEM AND CHANNEL ALLOCATION METHOD SUITABLE THEREFOR

[75] Inventor: Nobuhisa Kataoka, Kamakura, Japan

[73] Assignee: Mitsubishi Denki Kabushiki Kaisha, Tokyo, Japan

[21] Appl. No.: 325,488

[22] Filed: Oct. 19, 1994

[30] Foreign Application Priority Data

Oct. 26, 1993 [JP] Japan .................................. 5-267132

[51] Int. Cl.$^6$ ...................................................... H04B 7/00
[52] U.S. Cl. ........................ 455/34.2; 455/54.2; 455/53.1; 455/62
[58] Field of Search ................................... 455/34.1, 34.2, 455/33.1, 54.1, 53.1, 56.1, 62, 67.1, 161.1, 161.2, 161.3, 226.1, 226.2, 226.3, 54.2; 379/59

[56] References Cited

U.S. PATENT DOCUMENTS

| 5,396,649 | 3/1995 | Hamabe | ................................. 455/34.1 |
| 5,448,751 | 9/1995 | Takenaka et al. | .......................... 455/62 |

OTHER PUBLICATIONS

Toshihito Kanai "Autonomous Reuse Partitioning In Cellular Systems" Vehicular Technology Society 42nd VTS Conference.
Tadashi Nakamura, et al "All–Channel Concentric Allocation for Mobile Radio Systems" Technical Report of IEICE Sep. 1992.

Toshihito Kanai "Autonomous Reuse Partitioning in Micro–Cellular Systems" Technical Report of IEICE, Sep. 1992.

Primary Examiner—Reinhard J. Eisenzopf
Assistant Examiner—Doris To
Attorney, Agent, or Firm—Wolf, Greenfield & Sacks, P.C.

[57] ABSTRACT

A radio communication system represented by a micro cellular system and a channel allocation method suitable therefor. A receive signal level is measured in response to a call request issued from a mobile station. A search start channel is determined based on a measured level, and a search is sequentially made on a plurality of radio communication channels, starting with the thus determined search start channel, being a starting point. A radio communication channel specified by this search is subjected to evaluation of communication quality. The above search and communication quality evaluation are repeated while advancing the starting point to the subsequent radio communication channel until the evaluation result equals or exceeds a predetermined value. When the evaluation result equals or exceeds the predetermined value, radio communication is initiated between the mobile station and a base station by way of a specified radio communication channel.

At the time of completion of channel allocation processing, an empirical information, representing an information on radio communication channels previously used for radio communication between a mobile station and a base station, and correspondingly associated with receive signal levels measured on those occasions is updated for further channel allocation processing.

11 Claims, 12 Drawing Sheets

RADIO COMMUNICATION SYSTEM REPRESENTED BY MICRO CELLULAR SYSTEM AND CHANNEL ALLOCATION METHOD SUITABLE THEREFOR

BACKGROUND OF THE INVENTION a) Field of the Invention

The present invention relates to a radio communication system represented by a micro cellular system, and further to a channel allocation method suitable for the same.

b) Description of the Related Arts

Figure 10:
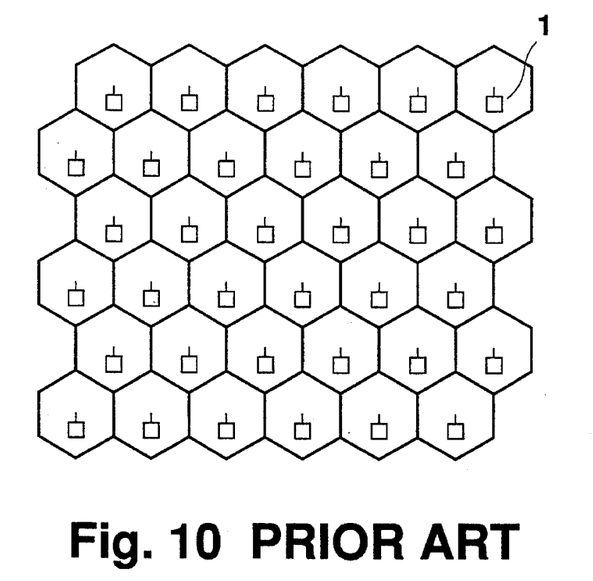
FIG. 10 is a diagram showing, by way of example, a cell layout.
Figure 11:
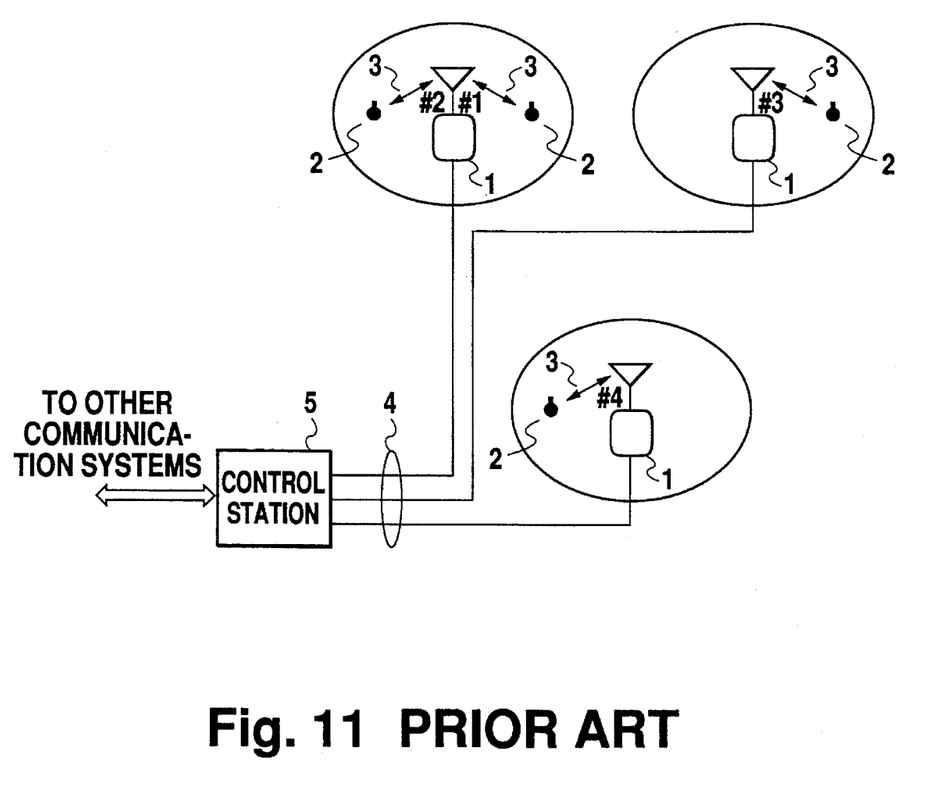
FIG. 11 is a diagram showing, by way of example, a configuration of a conventional cellular system.

A typical configuration of a micro cellular system is depicted in FIGS. 10 and 11 showing a cell layout and station-to-station interconnection, respectively.

In the cellular system, its coverage area is divided into a plurality of cells each being provided with a base station. Each cell is shaped like, for example, a hexagon as shown in FIG. 10, each base station taking charge of service within the associated cell where it is located. The main service each base station provides includes establishment and maintenance of a radio channel between a mobile station lying within the cell and the base station whereby a mobile station existing within a cell served by the base station can establish good communication with another mobile station or a fixed station (e.g., a station falling under another communication system). The mobile station herein represents a station installed in a vehicle or carried by a person. The radio channels for connecting a base station with a mobile station are referred to as a communication channel and a control information channel, and these are a channel for the communication between the two stations and a channel through which control information is transmitted for the establishment and maintenance of a communication channel, respectively.

Turning to FIG. 11, base stations 1 are individually arranged within each of the cells defined by an ellipse. The base stations 1 are each connected to a control station 5 by way of a control channel 4. The control channel 4 is in turn connected to other communication systems through, e.g., a public network. Each of the base stations 1, when a mobile station 2 lying within the cell it serves issues a call request via a control information channel (not shown), establishes a communication channel 3 between the mobile station 2 which has issued the call request and itself, and maintains this communication channel 3 until the completion of the communication. On the contrary, each of the base stations 1, when a mobile station 2 lying within the cell it serves is called by another mobile station 2 or a station constituting another communication system through another communication channel 3 or control channel 4, will establish a communication channel 3 between the mobile station 2 now being called and itself, and maintain this communication channel 3 until the communication is terminated. It is thus possible for the users of the mobile stations 2 to communicate with each other by way of the base station 1 and control station 5, and for the user of a mobile station 2 to communicate with the user of another communication system.

A plurality of communication channels 3 (or a plurality of frequencies) must be provided for due to the existence, normally, of a plurality of mobile stations 2, as well as interference waves in a single cell. Namely, in the case where a mobile station 2 within a cell uses a communication channel 3, another mobile station 2 lying within the same cell is not permitted to use the same communication channel 3. Further, a communication channel 3 unoccupied by another mobile station 2 but containing a significant interference wave would not ensure good communication. Therefore, the base station 1, when a mobile station 2 issues a call request, searches for an available communication channel (which is unoccupied by other mobile stations 2 and significantly uninfluenced by an interference wave) among a plurality of communication channels 3 provided for, and allocates the communication channel 3 found by the search to the mobile station 2 which has issued the call request. This processing is called channel allocation. Also, a cellular system including cells each having a reduced size of the order of 200 to 300 meters, is called a micro cellular system. The micro cellular system will allow a remarkable improvement in frequency resources consumption rate due to more effective reuse of the communication channels.

Figure 12:
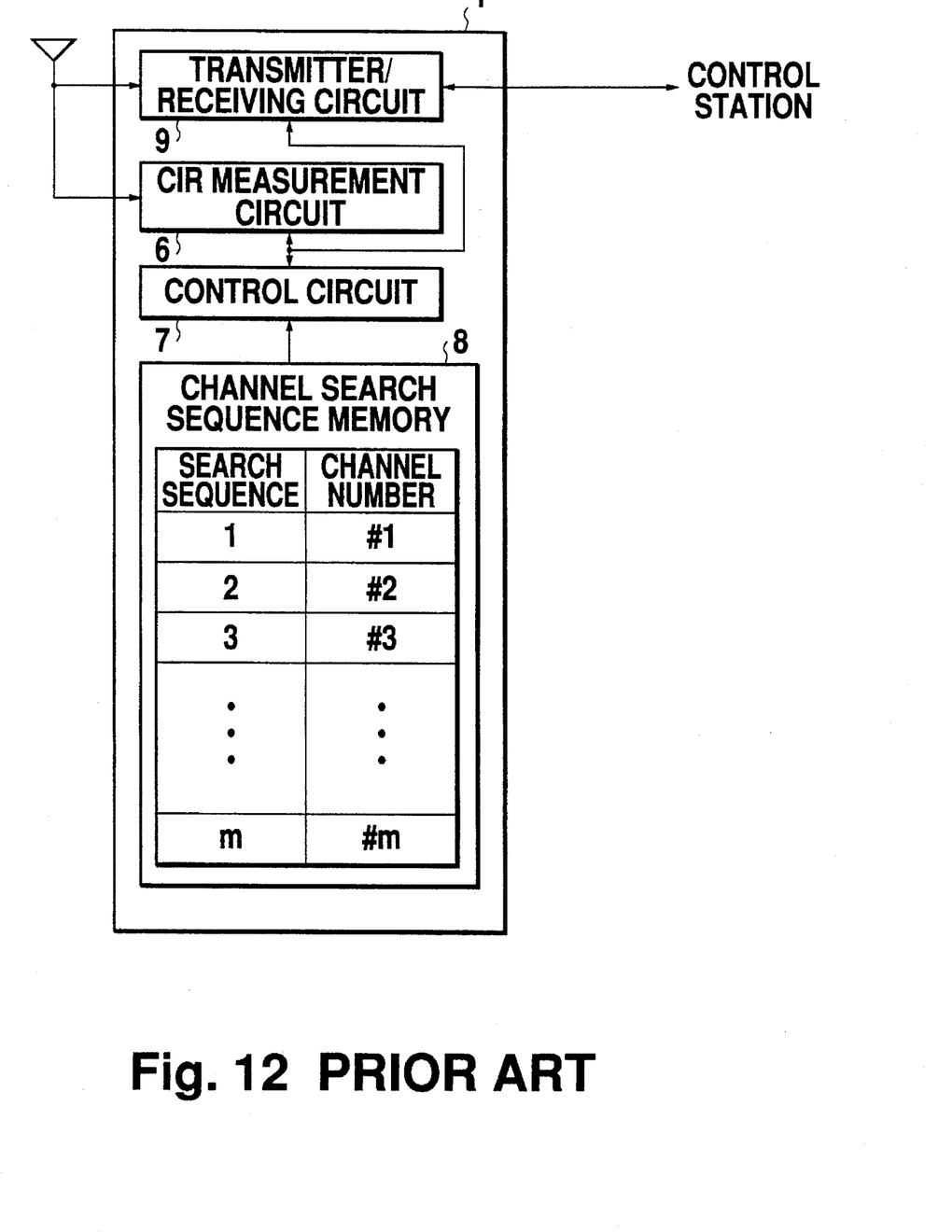
FIG. 12 is a diagram showing, by way of example, a configuration of a conventional base station.
Figure 13:
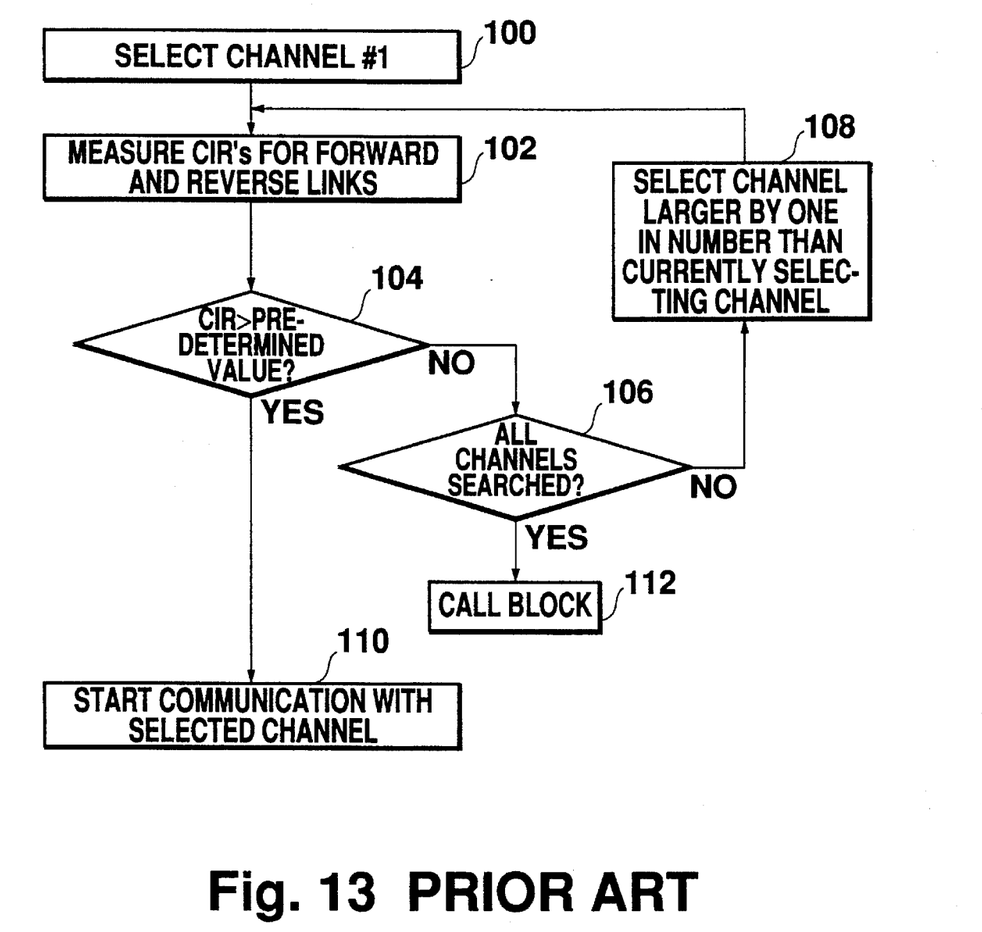
FIG. 13 is a flowchart showing a channel allocation process in the prior art.

FIGS. 12 and 13 illustrate an exemplary configuration of the base station 1, and an action of its control circuit 7, respectively. The configuration and action are substantially disclosed in, e.g., "Autonomous Reuse Partitioning in MicroCellular Systems", Toshihiko KANAI, NEC corporation C&C Systems Research Laboratories, Technical Report of IEICE, CS91-32 (1991), pp. 23–29. FIG. 13 depicts, in particular, a flow of the channel allocation processing.

The base station 1 shown in FIG. 12 comprises a CIR (carrier to interference power ratio) measurement circuit 6, a control circuit 7, a channel search sequence memory 8 and a transmitter/receiver circuit 9. When a call request is issued from a mobile station 2, it is received by the transmitter/receiver circuit 9 by way of a control information channel. In response to the receipt of the call request, the control circuit 7 refers to the information contained on the channel search sequence memory 8 in the order of search sequence. Channel numbers specifying the communication channels 3 are contained in the channel search sequence memory 8. Accordingly, read into the control circuit 7 through a first reference after the receipt of the call request is a channel number corresponding to the search sequence=1, that is, #1 in FIG. 12. The control circuit 7 causes the transmitter/receiver circuit 9 to send, via a control information channel to the mobile station 2 which has issued a call request, a command to transmit a carrier through a communication channel 3 having a channel number #1 (100 in FIG. 13, hereinafter similarly referenced).

Upon receiving a command to transmit a carrier, the mobile station 2 transmits a carrier to the base station 1. Simultaneously or almost simultaneously with the transmission of the carrier from the mobile station 2, the control circuit 7 causes the transmitter/receiver circuit 9 to transmit a carrier to the mobile station 2. The CIR measurement circuit 6 measures a CIR of the carrier transmitted from the mobile station 2, while the mobile station 2 measures a CIR of the carrier transmitted from the base station 1. The CIR measured at the base station 1 represents a quality of the reverse link pertaining to the transmission from mobile station 2 to base station 1, of the communication channel 3 having a channel number #1, whereas the CIR measured at the mobile station 2 represents a quality of the forward link associated with the transmission from the base station 1 to mobile station 2. The CIR measurement circuit 6 supplies the thus measured CIR to the control circuit 7, and the mobile station 2 transmits the thus measured CIR via a control information transmission channel to the base station 1. The transmitter/receiver circuit 9 provides the received CIRs to the control circuit 7 (102).

The control circuit 7 functions to judge whether the CIR's at least a predetermined value (104). If at least one of the forward and reverse links is not judged to be at least the predetermined value, the control circuit 7 reads out the subsequent channel number sequentially contained in the channel search sequence memory 8, in this instance, #2. The control circuit 7 causes the transmitter/receiver circuit 9 to issue to the mobile station 2 a command to transmit a carrier through the communication 3 having a channel number #2 (106, 108).

When the CIR's of the forward and reverse links of the communication channel 3 having a channel number #2 are measured (102), the control circuit 7 Judges whether the CIR's are at least a predetermined value (104). If at some point after the repetition of such action the two CIR's are judged to be at least the predetermined value, then the control circuit 7 causes the transmitter/receiver circuit 9 to issue to the mobile station 2 a command to initiate a communication through the communication channel having such good CIR's (110). On the contrary, in the case of respective judgments of all the channel numbers stored in the channel search sequence memory 8 resulting in unsatisfactory CIR's, it will be considered to be impossible to execute channel allocation, thus leading to a call block (104, 106, 112).

One of the features of such a channel allocation method is that, among a plurality of communication channels, some communication channels having relatively small channel numbers are readily available. In other words, since the evaluation of CIR is conducted in the order of channel number, communication channels having relatively small channel numbers are frequently used in such a manner that #1 presents a highest frequency of use, #2 presents a second highest and so on.

A second feature is that some communication channels 3 having relatively small channel numbers are liable to undergo interference, which will lead to a deterioration of CIR. For instance, assume that two communication channels 3 having relatively small channel numbers are simultaneously used at some point. In this case, a carrier used in one of the two communication channels 3 is merely an interference wave when viewed from the other. Further, for instance, two communication channels 3 having close channel numbers are simultaneously used in the adjacent cells, respectively. A carrier wave used in one of the two communication channel 3 is also an interference wave when envisaged from the other. That is, as a result of a higher frequency of use of the communication channels 3 having relatively small channel numbers, some communication channels 3 having relatively small channel numbers tend to cause interference.

Figure 14:
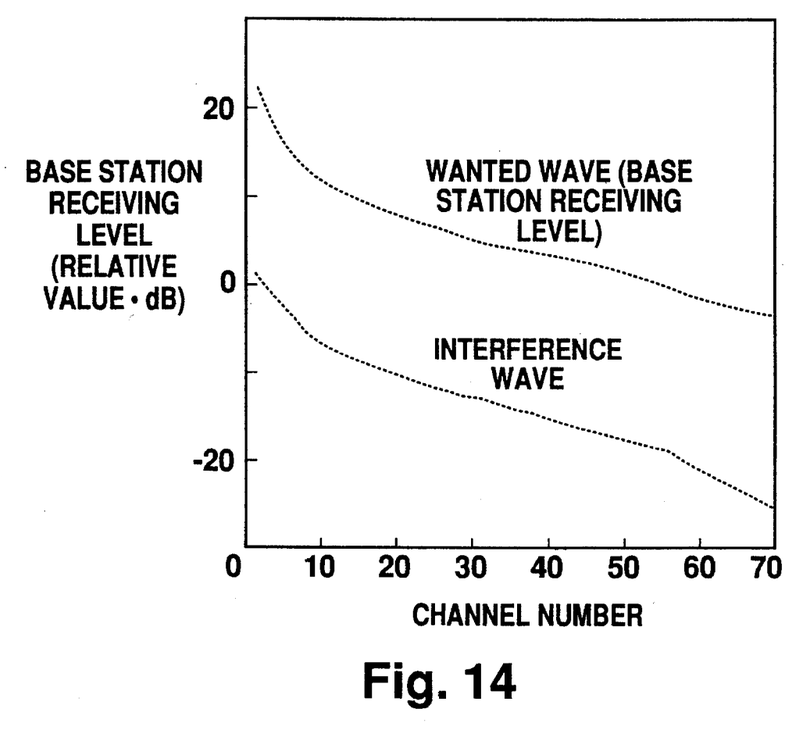
FIG. 14 is a diagram showing the results of simulation.

A third feature resides in the fact that the communication channels 3 having relatively small channel numbers tend to be allocated to the mobile stations 2 relatively closer to the base station 1, whereas the communication channels 3 having relatively large channel numbers tend to be allocated to the mobile stations 2 relatively distant from the base station 1. In other words, a shorter distance between a base station 1 and a mobile station 2 will reduce an attenuation of the carrier caused by radio transmission, which will in turn increase the carrier received power. On the contrary, a greater distance between a base station 1 and a mobile station 2 will increase an attenuation caused by radio transmission, which will in turn reduce the carrier received power. The CIR which is used as a judgment reference at the time of channel allocation is a ratio of the carrier received power to the interference wave received power, and hence a larger carrier wave received power will result in a good CIR value irrespective of a slightly larger interference wave received power. A simulation using as a model a system (refer to FIG. 10) including 36 (6 in a row×6 in a column) regular hexagonal cells resulted in a relationship between the channel numbers, and carrier received power and interference wave received power as shown in FIG. 14. Represented as "wanted wave" in this diagram is a carrier having a selected channel number. As is apparent from the result of this simulation, the communication channels having relatively smaller channel numbers are being used by mobile stations 2 relatively closer to the base stations 1 with a larger carrier received power.

These aspect of the third feature may entail a problem that the mobile stations 2 relatively distant from the base stations 1 are subjected to a larger connection delay. More specifically, upon allocating a communication channel 3 to relatively distant mobile stations 2 which will present a smaller carrier received power, repeatedly executed in the search order is a process including the steps of reading out a channel number 2 from the channel search sequence memory 8 and judging whether the CIR at that channel number is at least a predetermined value, which will increase the time taken to complete the channel allocating process. Additional time taken for the completion of the channel allocating process will lead to a need to provide the base stations 1 with a holding function allowing other mobile station 2 to stand by, so as to be capable of coping with the case when a call request is received from another mobile station 2 during the time which the channel allocation is being executed. In this manner, the conventional system involved problems such as poor service quality due to the connection delay, and complicated functions of the base stations.

SUMMARY OF THE INVENTION

It is therefore an object of the present invention to enable the channel allocation to be completed with less search iterations.

Another object of the present invention is to realize a system having a shorter connection delay and a higher service quality.

A further object of the present invention is to realize a system including a base station having a relatively simple function.

According to a first aspect of the present invention, there is provided a channel allocation method comprising the steps of:

a) measuring a receive signal level at a base station when a mobile station has issued a call request;

b) deciding a search start channel based on the measured signal level;

c) specifying a single radio communication channel by searching a plurality of radio communication channels, starting with a decided search start channel, being a starting point;

d) evaluating a communication quality of a specified radio communication channel;

e) allowing repetition of the search and communication quality evaluation while advancing the starting point to the subsequent radio communication channel until evaluation result equals or exceeds a predetermined value;

f) allowing initiation of radio communication between the mobile station and the base station by way of a specified radio communication channel when the evaluation result equals or exceeds a predetermined value;

g) storing an empirical information, representing an information on radio communication channels previously used for radio communication between a mobile station and a base station, and correspondingly associated with receive signal levels measured on those occasions; and h) updating the empirical information.

In the present invention, a receive signal level at a base station is measured in response to a call request issued from a mobile station. The receive level at the base station roughly represents a distance to the mobile station from the base station. This means that a nearby mobile station will present a higher base station receive level, whereas a distant mobile station presents a lower one. In the present invention, a search start channel is determined based on the base station receive signal level, and a search is sequentially made for a plurality of radio communication channels, beginning with the search start channel defined as a starting point. Further, the radio communication channel specified by the search is subjected to evaluation of communication quality of its forward and reverse links in terms of, e.g., CIR. The search and communication quality evaluation are repeated while advancing the starting point to the subsequent communication channel until the result of evaluation equals or exceeds a predetermined value. Once the result of evaluation equals or exceeds the predetermined value, radio communication is initiated between the mobile station and the base station by way of a specified radio communication channel.

Thus, in lieu of evaluating the communication quality sequentially, and always starting with a first channel number as in the prior art, the communication quality evaluation and so on is carried out sequentially, but starting with a channel number determined (duly limited) based on the base station receive level. Consequently, the present invention will ensure a rapid allocation of communication channel to a distant mobile station.

It is to be noted that the base station receive level can be measured on the CIR measurement circuit so that there is no need for any additional measurement circuit. Upon deciding a search start channel depending on the base station receive signal level, reference may be made to either empirical information or statistical information. In this instance, the empirical information is information on radio communication channels previously used for radio communication between a mobile station and a base station, and correspondingly associated with receive signal levels measured on those occasions, while the statistical information is previously provided information on a relationship between radio communication channels and receive signal levels. In the case of using the empirical information, the empirical information which has been referred to in deciding search start channels is subjected to a statistical application for each of radio communication channels, and the channel defined as the search start channel is a radio communication channel corresponding to, among obtained results of statistical application, a result of statistical application closest to the measured receive signal level. Preferably, the variance in measurement values is compensated for, irrespective of which information is used.

The above-described channel allocation method can be exclusively implemented as an action of the base station. That is, according to a second aspect of the present invention, there is provided a radio communication system comprising:

a) a mobile station which issues a call request in response to a user's operation; and b) a base station;
the base station including:

b1) means for measuring a receive signal level at the base station when the mobile station has issued a call request;

b2) means for deciding a search start channel based on a measured receive signal level;

b3) means for specifying a single radio communication channel by sequentially searching a plurality of radio communication channels, starting with a decided search start channel being a starting point;

b4) means for evaluating the communication quality of a specified radio communication channel;

b5) means for allowing repetition of the search and communication quality evaluation while advancing the starting point to the subsequent radio communication channel until the evaluation result equals or exceeds a predetermined value;

b6) means for allowing initiation of radio communication between the mobile station and the base station by way of a specified radio communication channel when the evaluation result equals or exceeds a predetermined value;

b7) means for storing an empirical information, representing an information on radio communication channels previously used for radio communication between a mobile station and a base station, and correspondingly associated with receive signal levels measured on those occasions; and b8) means for updating the empirical information.

According to a third aspect of the present invention, there is provided a base station comprising:

a) means for measuring a receive signal level at the base station when the mobile station has issued a call request;

b) means for deciding a search start channel based on a measured receive signal level;

c) means for specifying a single radio communication channel by sequentially searching a plurality of radio communication channels, starting with a decided search start channel, being a starting point;

d) means for evaluating the communication quality of a specified radio communication channel;

e) means for allowing repetition of the search and communication quality evaluation while advancing the starting point to the subsequent radio communication channel until the evaluation result equals or exceeds a predetermined value;

f) means for allowing initiation of radio communication between the mobile station and the base station by way of a specified radio communication channel when the evaluation result equals or exceeds a predetermined value;

g) means for storing an empirical information, representing an information on radio communication channels previously used for radio communication between a mobile station and a base station, and correspondingly associated with receive signal levels measured on those occasions; and h) means for updating the empirical information.

A part of the above-described channel allocating function may be transferred to the control station to thereby miniturize the base station, and therefore, the system hardware. That is, according to a fourth aspect of the present invention, there is provided a radio communication system comprising:

a) a mobile station which issues a call request in response to a user's operation;

b) a base station; and c) a control station;

the base station including:

b1) means for measuring a receive signal level at the base station when the mobile station has issued a call request;

b2) means for specifying a single radio communication channel by sequentially searching a plurality of radio communication channels, starting with a decided search start channel, being a starting point;

b3) means for evaluating the communication quality of a specified radio communication channel;

b4) means for allowing repetition of the search and communication quality evaluation while advancing the starting point to the subsequent radio communication channel until the evaluation result equals or exceeds a predetermined value; and   b5) means for allowing initiation of a radio communication between the mobile station and the base station by way of a specified radio communication channel when the evaluation result equals or exceeds a predetermined value;

the control station including:

c1) means for deciding a search start channel based on the measured receive signal level;

c2) means for storing an empirical information, representing an information on radio communication channels previously used for radio communication between a mobile station and a base station, and correspondingly associated with receive signal levels measured on those occasions; and   c3) means for updating the empirical information.

BRIEF DESCRIPTION OF THE DRAWINGS

The features, objects, and advantages of the present invention will become more apparent from the detailed description set forth below when taken in conjunction with the drawings in which.

DESCRIPTION OF THE PREFERRED EMBODIMENTS

Preferred embodiments of the present invention will now be described with reference to the accompanying drawings. It is to be noted that like reference numerals represent similar or corresponding constituent elements as those in the conventional examples depicted in FIGS. 10 to 14, which will not be further described.

a) First Embodiment

Figure 1:
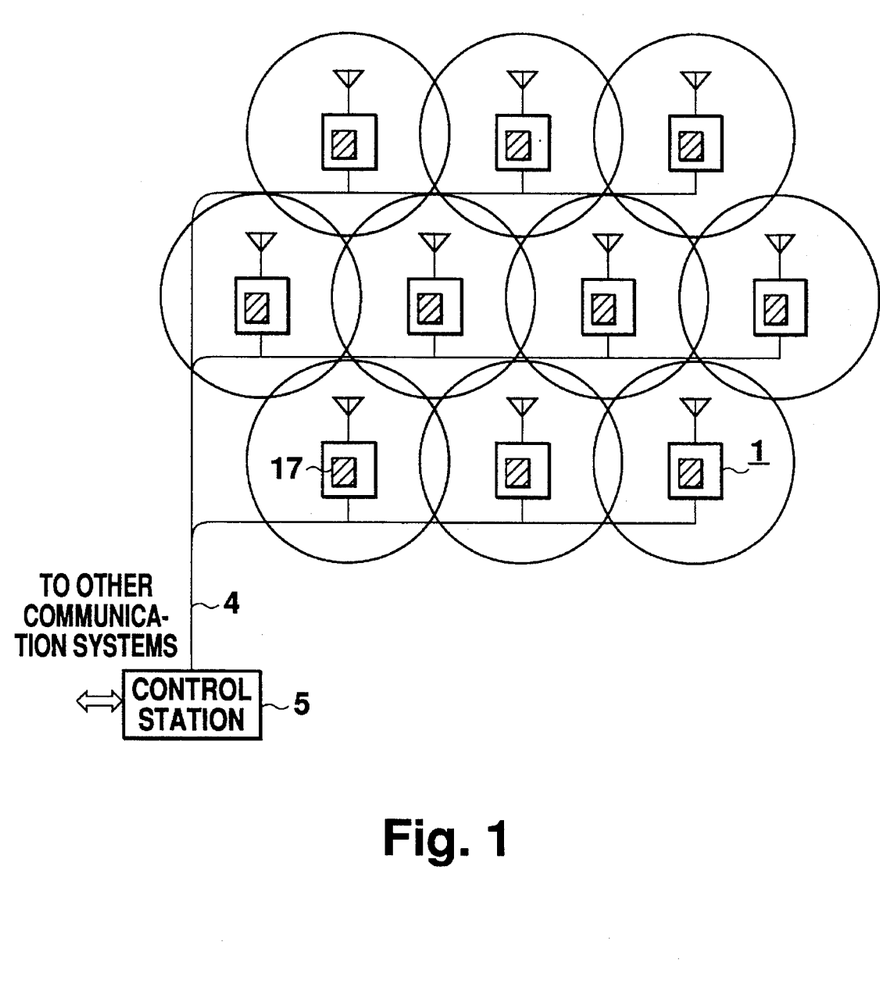
FIG. 1 is a diagram showing a configuration of a micro cellular system in accordance with a first embodiment of the present invention.

FIG. 1 illustrates a micro cellular system configured in accordance with a first embodiment of the present invention and comprising a plurality of base stations each generally designated at 1. In this embodiment, the base stations 1 are each provided with a search start channel control circuit 17.

Figure 2:
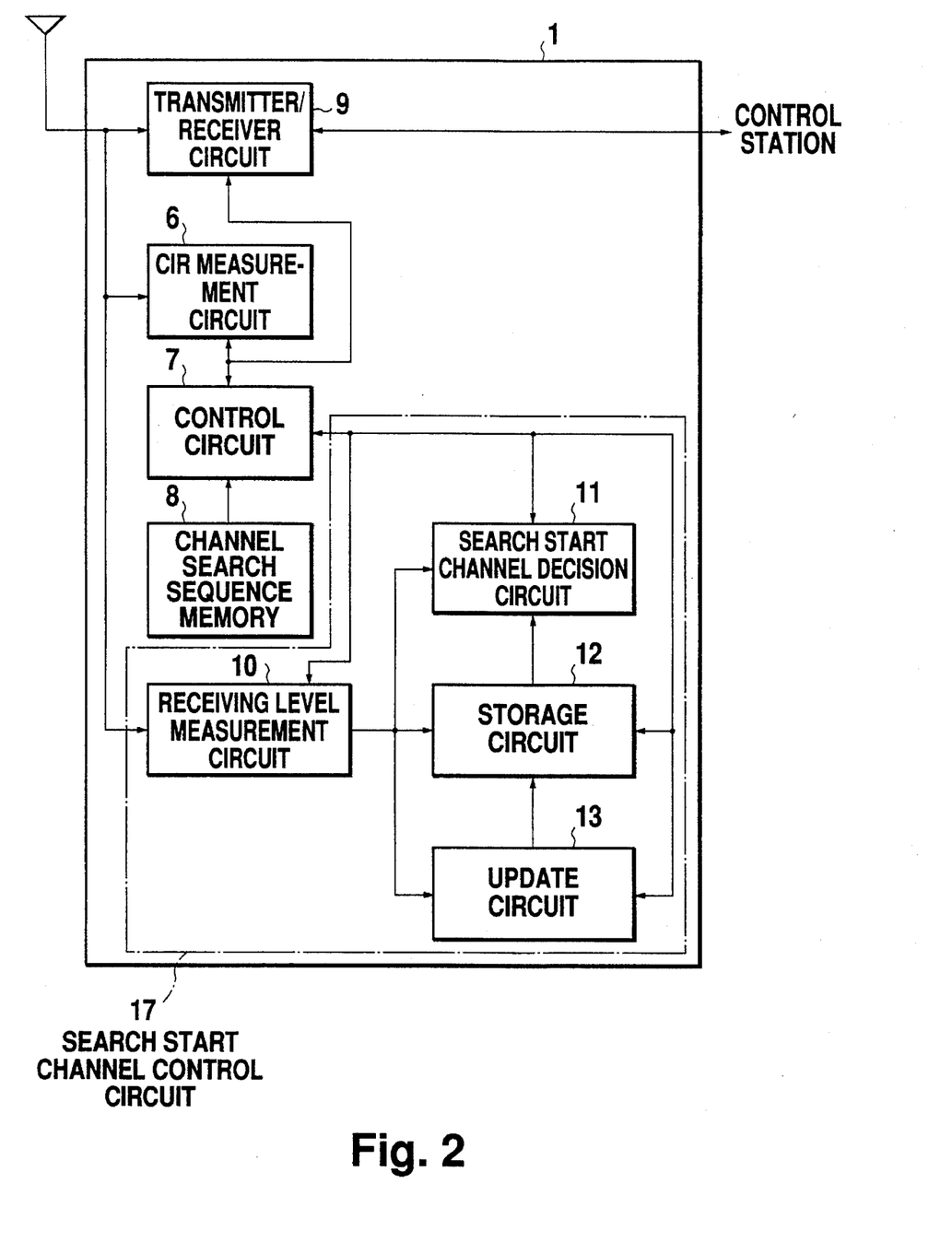
FIG. 2 is a block diagram showing a configuration of a base station in the embodiment depicted in FIG. 1.

FIG. 2 depicts a configuration of the base station 1 in the first embodiment. The base station 1 of this embodiment includes the search start channel control circuit 17 in addition to the elements constituting the base station 1 depicted in FIG. 12. The search start channel control circuit 17 consists of a receive level measurement circuit 10, a search start channel decision circuit 11, a storage circuit 12 and an update circuit 13. The receive level measurement circuit 10 is intended to measure the received power (base station receive level) of a carrier transmitted from a mobile station 2, in response to a command from the control circuit 7, and to provide the results to the search start channel decision circuit 11 and the storage circuit 12. In compliance with a command from the control circuit 7, the search start channel decision circuit 11 compares the base station receive level measured by the receive level measurement circuit 10 with information contained on the storage circuit 12, thereby deciding a search start channel, which is impartated to the control circuit 7. The storage circuit 12 correspondingly stores initialized or precedently measured base station receive levels and associated channel numbers to be allocated when these base station receive levels are measured. The update circuit 13, in response to a command issued from the control circuit 7, updates the information contained on the storage circuit 12, based on the base station receive level measured by the receive level measurement circuit 10 and on the allocated channel number.

Figure 3:
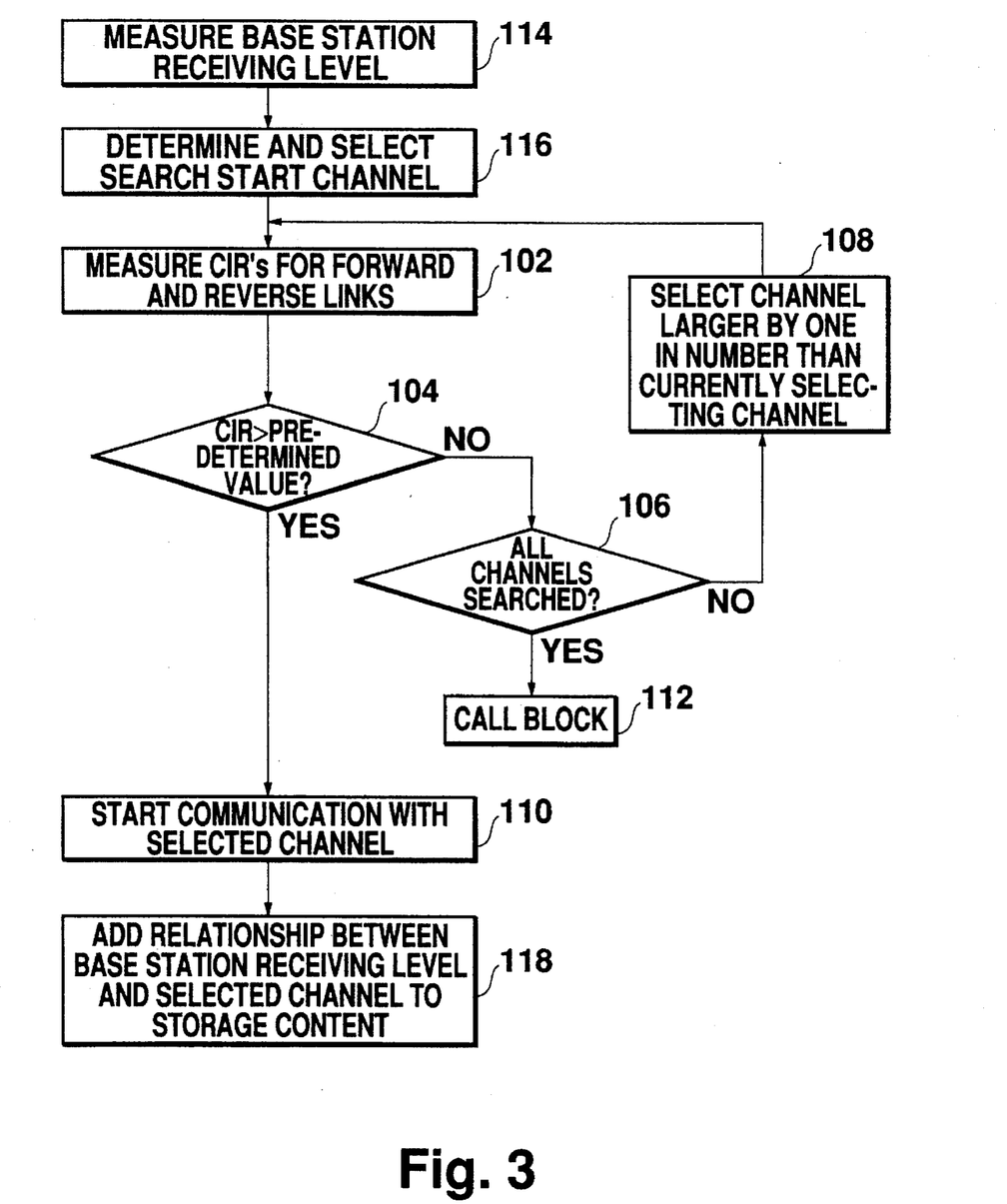
FIG. 3 is a flowchart showing a channel allocation process in FIG. 1 embodiment.

FIG. 3 depicts a flow of action of the control circuit 7 in this embodiment. Illustrated in this diagram is the flow of a channel allocation action.

When a call request is issued from a mobile station 2, it is received by a transmitter/receiver circuit 9 by way of a control information channel, not shown. Upon receipt of the call request, the control circuit 7 accordingly provides, to the receive level measurement circuit 10, a command to measure the carrier received power (base station receive level) from the mobile station 2 which has issued the call request (114). After the measurement of the base station receive level, the control circuit 7 allows information concerning the base station receive level to be transferred from the storage circuit 12 to the search start channel decision circuit 11. A search start channel is then determined by the search start channel decision circuit 11, based on the base station receive level measured by the receive level measurement circuit 10, on the information read out from the storage circuit 12, and on a predetermined margin 6. The control circuit 7 refers to the information contained in the channel search sequence memory 8 in the order of the search sequence, beginning with the thus determined search start channel, being a search start point. The channel search sequence memory 8 stores therein channel numbers individually specifying the communication channels 3 as described above. Accordingly, if the determined search start channel is, for example, channel number #4, then the first reference after the decision of the search start channel will allow the channel number #4 corresponding to the search sequence=4 to be read into the control circuit 7. The control circuit 7 causes the transmitter/receiver circuit 9 to issue, through the control information channel, to the mobile station 2 which has presented the call request, a command to transmit a carrier by way of a communication channel 3 designated by channel number #4 (116). Upon receipt of the command to transmit a carrier, the mobile station 2 transmits the carrier to the base station 1. Simultaneously or almost simultaneously with the transmission of the carrier from the mobile station 2, the control circuit 7 causes the transmitter/receiver circuit 9 to transmit a carrier to the mobile station 2. The CIR measurement circuit 6 measures the CIR of signals transmitted from the mobile station 2, that is, the CIR of the reverse link, whereas the mobile station 2 measures the CIR of signals transmitted from the base station 1, that is, the CIR of the forward link. The CIR measurement circuit 6 supplies the thus measured CIR to the control circuit 7, and the mobile station 2 transmits the measured CIR by way of the control information transmission channel to the base station 1. The transmitter/receiver circuit 9 provides the thus received CIR to the control circuit 7 (102).

The control circuit 7 Judges whether these CIR's are at least a predetermined value (104). If at least one of the forward link and reverse link results is not judged to be at least the predetermined value, the control circuit 7 reads out the subsequent channel number stored sequentially in the channel search sequence memory 8, in this instance, #5. The control circuit 7 causes the transmitter/receiver circuit 9 to transmit to the mobile station 2 a command to transmit a carrier by way of a communication channel 3 having channel number #5 (106, 108).

When the CIR's for the forward and reverse links of the communication channel 3 having channel number #5 are measured (102), the control circuit 7 judges whether or not these CIR's are at least a predetermined value (104). If at some point after the repetition of such action it is judged that these CIR's are both at least the predetermined value, then the control circuit 7 causes the transmitter/receiver circuit 9 to transmit to the mobile station 2 a command to initiate communication through the communication channel 3 which has presented a satisfactory CIR (110). On the contrary, in the case that respective judgments of all the channel numbers stored on the channel search sequence memory 8 result in unsatisfactory CIR's, it will be considered to be impossible to execute channel allocation, thus leading to a call block (104, 106, 112). At the time of completion of channel allocation processing, the control circuit 7 confers a command on the update circuit 13 so as to cause the storage circuit 12 to additionally store therein the base station receive level measured by the receive level measurement circuit 10, and allocated channel number (118).

Figure 4:
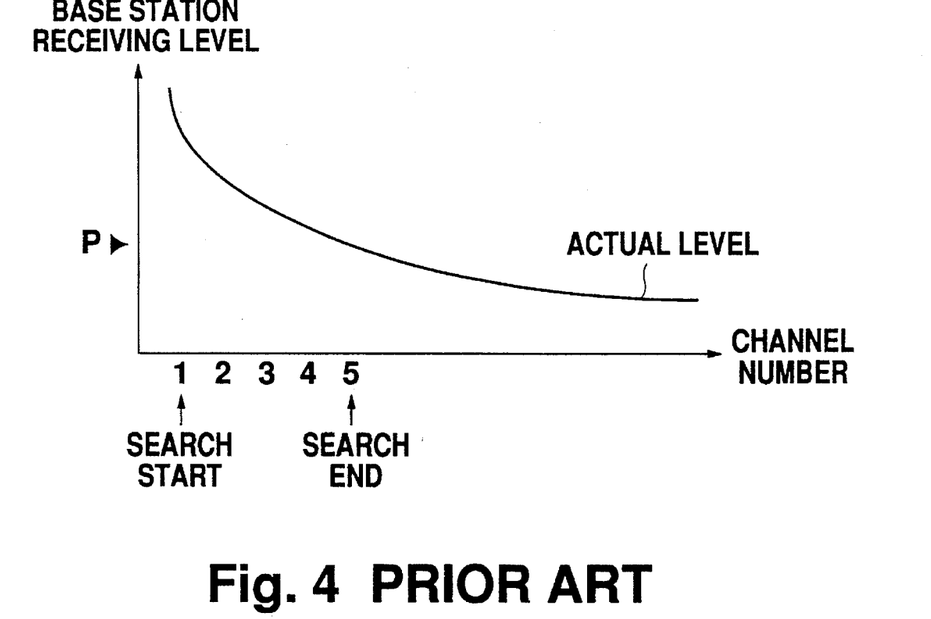
FIG. 4 is a diagram showing a problem involved in the conventional example.
Figure 5:
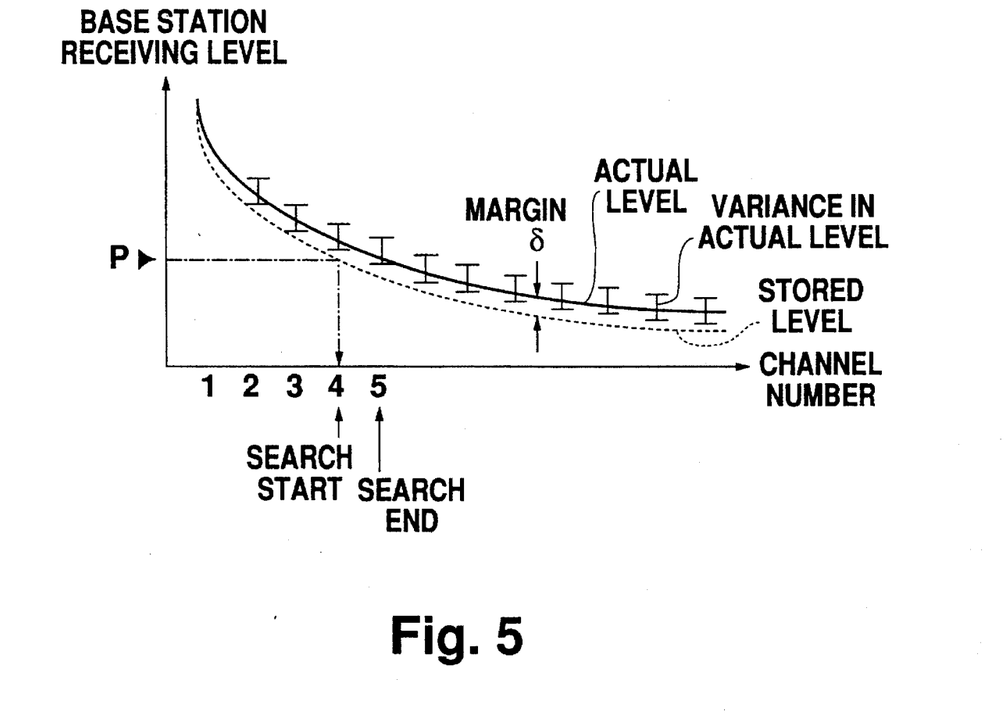
FIG. 5 is a diagram showing the processing in FIG. 1 embodiment.

FIGS. 4 and 5 illustrate, in contrast with the conventional example, the content of the search start channel deciding action in this embodiment, and the content of information to be stored on the storage circuit 12. In particular, FIG. 4 depicts the setting of the search start channel in the conventional example, and FIG. 5 depicts the features of this embodiment.

In the conventional example, as discussed earlier, the channel numbers contained in the channel search sequence memory 8 are read out in the order of search sequence from the leading number or #1 so that the search constantly begins with the channel number #1. In the case where a mobile station 2 at a position distant from the base station issues a call request, all that is seen is a relatively low base station receive level as indicated by P in FIG. 4, with the result that the search takes a substantial time to complete. If the channel number to be allocated is #5, for instance, then the search must be made over the five channel numbers in total including #1 to #5, which will lead to an elongated time being taken for the channel allocation to be completed.

In this embodiment, on the contrary, the storage circuit 12 contains therein the base station receive levels and associated channel numbers stored by initialization or former processing. In other words, stored therein is such information as "this channel number was allocated to these base station receive levels before", obtained by measurement. In this embodiment, the base station receive levels being contained on the storage circuit 12 are subjected to predetermined statistical applications, e.g., median operation or mean value operation for each of corresponding channel numbers, thereby comparing the thus obtained representative value Sk (k: channel number) with the base station receive level measured by the receive level measurement circuit 10. Consequently, set as a search start channel number is a channel number k correspondingly associated with the representative value Sk relatively close to the measured base station receive level. Accordingly, if it is assumed that the channel number allocated is #5, the search can begin with a channel number relatively close to #5 such as #4, as shown in FIG. 5, which will reduce the time required for the channel allocation.

FIG. 5 allows for a variance in the values of the base station receive levels obtained by the measurement. Namely, in order to ensure a more accurate channel allocation by making allowance for the measurement variance, a margin $\delta$ is used in deciding the search start channel. More specifically, a base station receive level P obtained by the measurement is compared with a value obtained by subtracting the margin $\delta$ from a representative value Sk. As a result, defined as a search start channel is a channel designated by the smallest k among k's satisfying $P \geq Sk-\delta$. This will ensure an accurate setting of the search start channel irrespective of the variance in measurement of the base station receive level.

Further, in this embodiment, since the information stored in the storage circuit 12 is updated in each allocation process, the value of the representative value Sk for use in deciding the search start channel can present a higher reliability by virtue of the learning effect, thus resulting in a more accurate decision of the search start channel each time the channel allocation processing is repeated.

Figure 6:
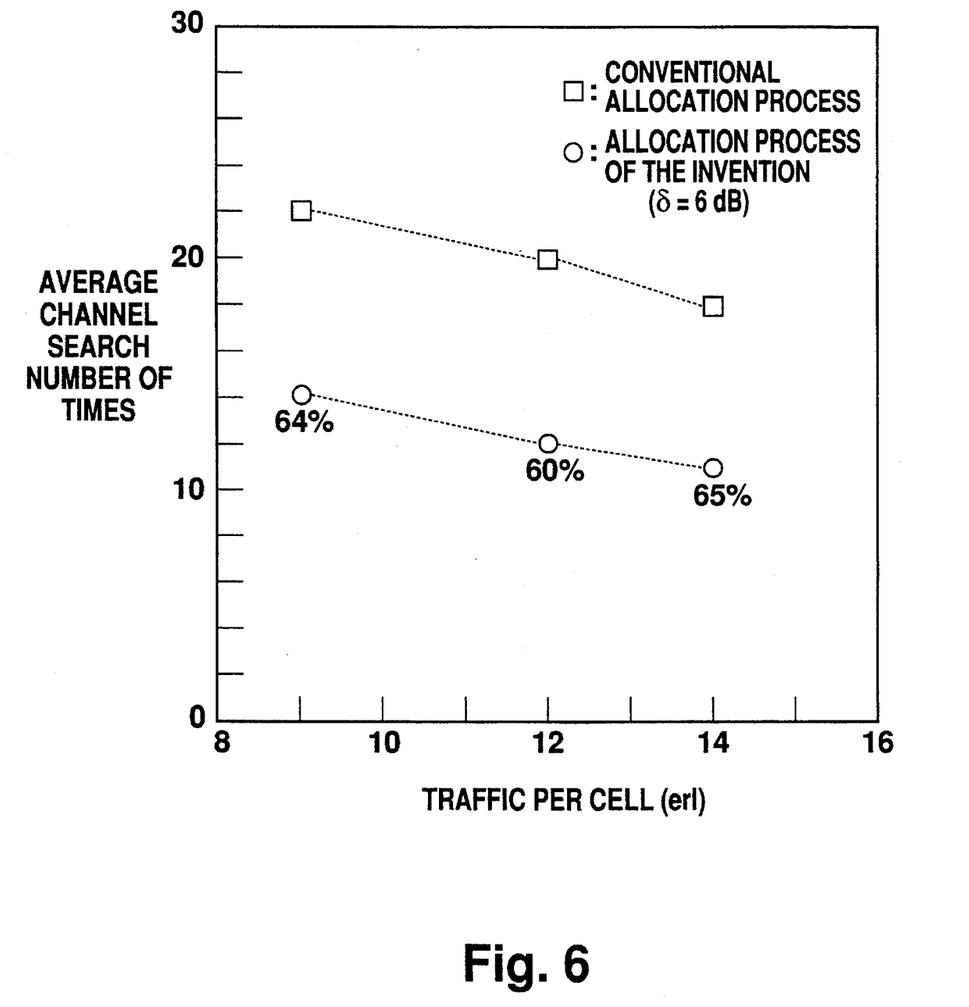
FIG. 6 is a diagram showing an effect of FIG. 1 embodiment.

FIG. 6 depicts, in the form of simulation results, an effect of reducing the average number of channel search iterations presented by this embodiment. As seen from this diagram, the first embodiment ensures an approximately 60 to 65% reduction in average channel search iterations compared with the conventional allocation type.

b) Second Embodiment

Figure 7:
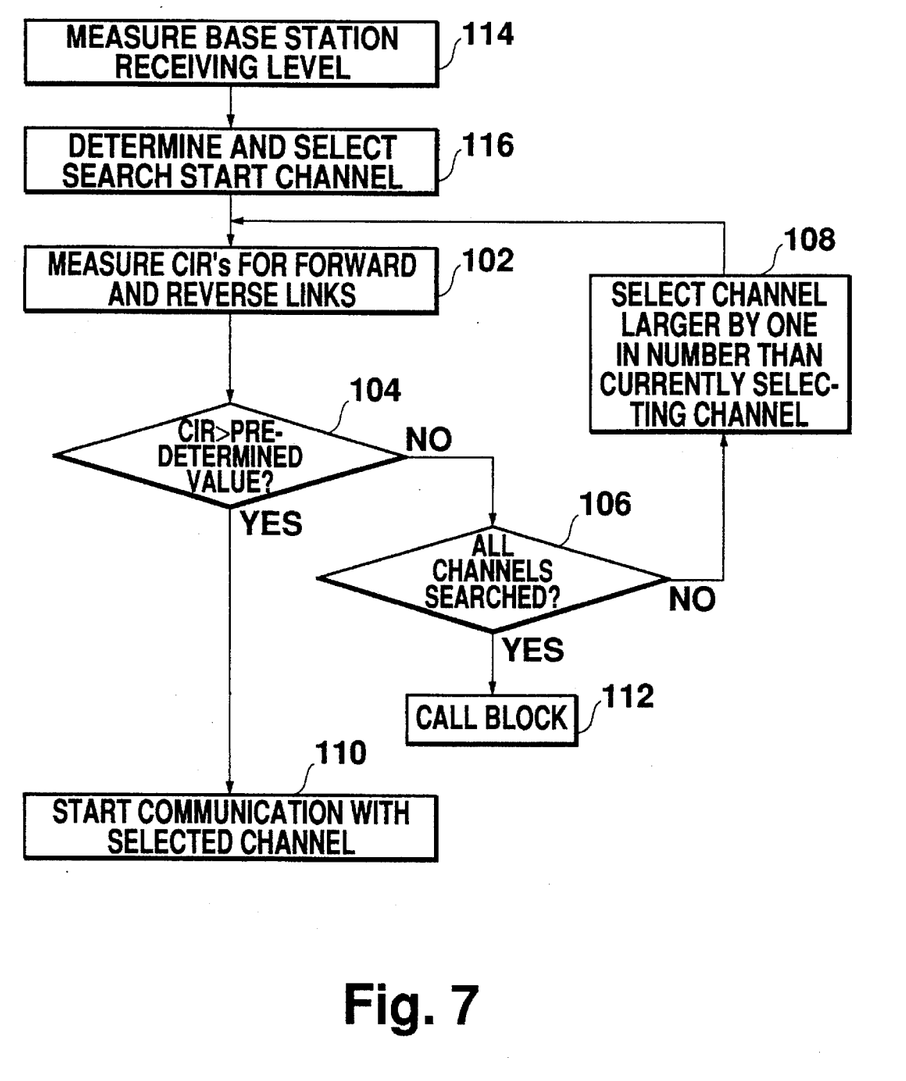
FIG. 7 is a flowchart showing a channel allocation process in accordance with a second embodiment of the present invention.

FIG. 7 depicts a flow of action of the control circuit 7 in a second embodiment of the present invention, in particular, a flow of a channel allocating action. The system and device configurations are substantially the same as the first embodiment, and hence the description thereof will be omitted.

Read deciding a search start channel in this embodiment, statistical data such as mean values are read out of the storage circuit 12, not the initialization data or the past measurement data. Namely, in lieu of finding representative values Sk in the search start channel decision circuit 11, the representative values Sk themselves are previously contained in the storage circuit 12. This will eliminate the necessity of providing the step 118.

c) Third Embodiment

Figure 8:
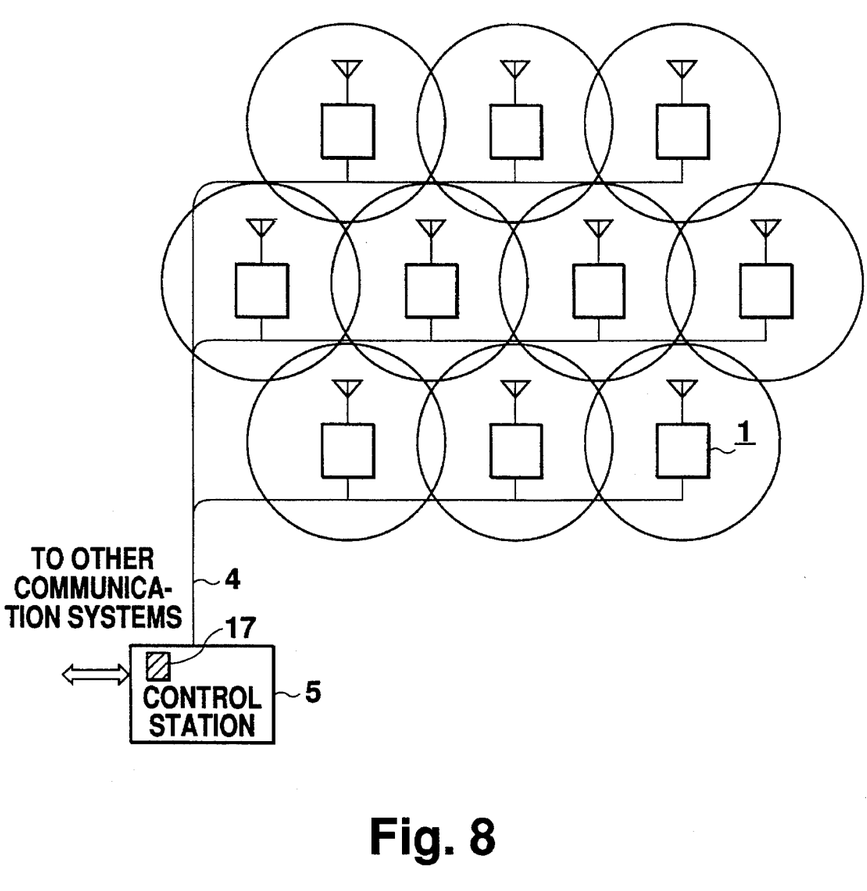
FIG. 8 is a diagram showing a configuration of a micro cellular system in accordance with a third embodiment of the present invention.

FIG. 8 depicts a micro cellular system configured in accordance with a third embodiment of the present invention. This embodiment comprises a control station 5 exclusively including a search start channel control circuit 17 to thereby reduce the entire hardware in scale.

Figure 9:
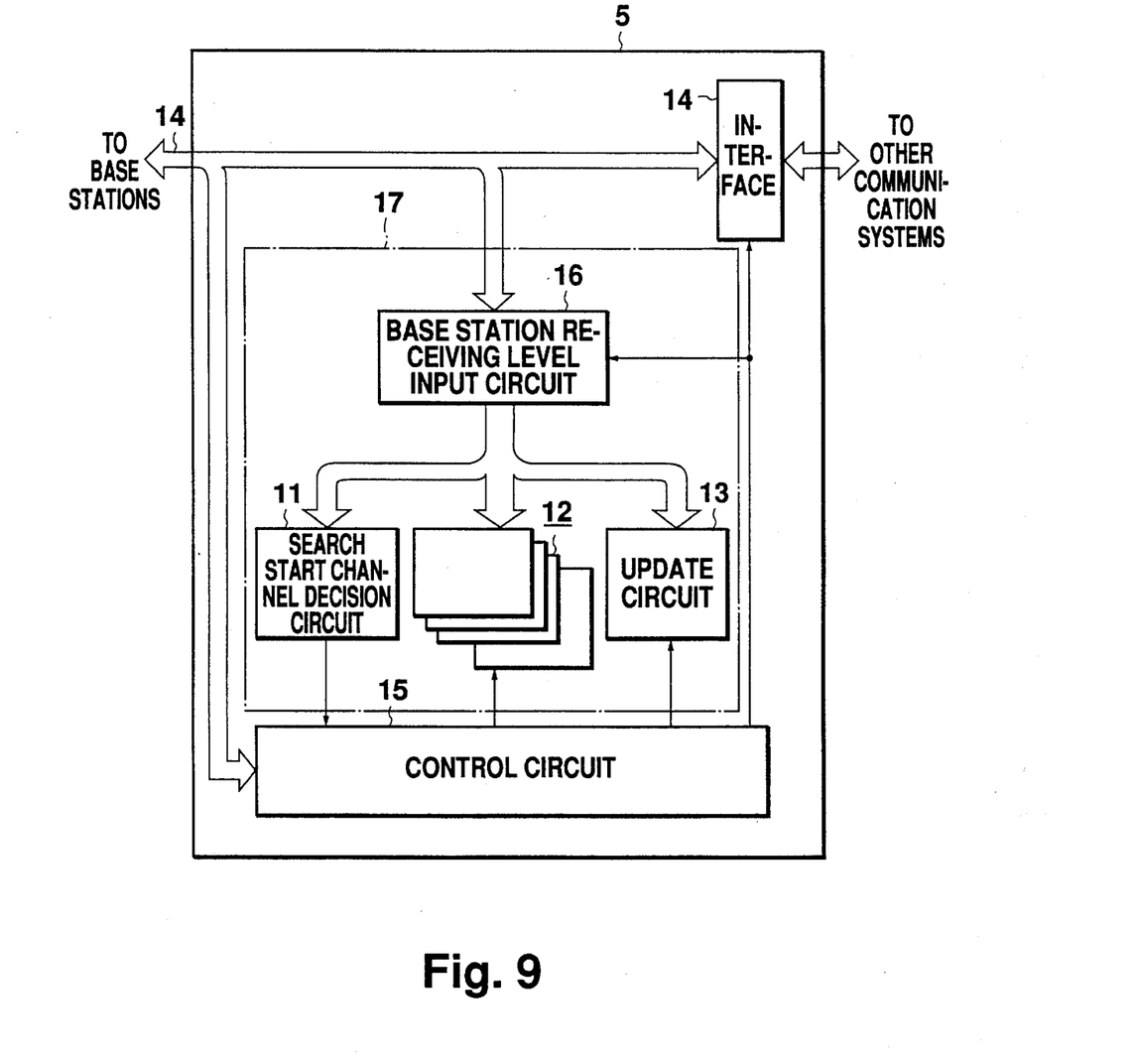
FIG. 9 is a block diagram showing a configuration of a control station in the embodiment depicted in FIG. 8.

FIG. 9 depicts a configuration of the control station 5 employed in this embodiment. The control station 5 includes an interface 14, a control circuit 15 and the search start channel control circuit 17. The interface 14 is an interface pertaining to an interconnection between the FIG. 8 system and other communication systems, and the control circuit 15 serves to manage the action of the entire control station 5.

The search start channel control circuit 17 consists of a search start channel decision circuit 11, a storage circuit 12, an update circuit 13 and a base station receive level input circuit 16. When a base station 1 receives a call request from a mobile station 2, the control circuit 7 included in the base station 1 commands a CIR measurement circuit 6 to measure a base station receive level and then transmits the result, by way of a control channel 4, to the control station 5. The control circuit 15 causes the base station receive level input circuit 16 to input the transmitted base station receive level. Afterwards, the control circuit 15, in compliance with the same procedure as that of the control circuit 7 in the first embodiment, causes the search start channel decision circuit 11 to determine a search start channel and then transmits the thus determined search start channel to the base station 1 by way of the control channel 4. The base station 1 executes a search starting with the transmitted search start channel, and transmits a finally determined channel number through the control channel 4 to the control station 5. The control circuit 15 commands the update circuit 13 to allow the measured base station receive level to be correspondingly associated with the determined channel number for storage into the storage circuit 12. It will be appreciated that the storage circuit 12 includes a plurality of storage spaces for respective base stations 1.

d) Supplement

Although a micro cellular system has been hitherto described by way of example, the present invention is applicable to other radio communication systems, the variation or modification for which will be apparent to those skilled in the art based on the content of disclosure of the present invention. The receive level measurement circuit 10 need not be normally provided since there can be utilized a part of the function of the CIR measurement circuit 6 finding a carrier received power and interference wave received power to detect their ratio, in other words, a function detecting the carrier received power.

What is claimed is:

1. A radio communication system comprising:
   a mobile station which issues a call request in response to user's operation; and
   a base station;
   said base station including:
   means for measuring a receive signal level at said base station when said mobile station has issued a call request;
   means for deciding a search start channel based on the measured receive signal level;
   means for specifying a single radio communication channel by sequentially searching a plurality of radio communication channels, starting with a decided search start channel, being a starting point;
   means for evaluating a communication quality of a specified radio communication channel;
   means for allowing repetition of the search and communication quality evaluation while advancing said starting point to the subsequent radio communication channel until evaluation result equals or exceeds a predetermined value;
   means for allowing initiation of radio communication between said mobile station and said base station by way of a specified radio communication channel when said evaluation result equals or exceeds a predetermined value;
   means for storing an empirical information, representing an information on radio communication channels previously used for radio communication between a mobile station and a base station, and correspondingly associated with receive signal levels measured on those occasions; and
   means for updating said empirical information.

2. A base station comprising:
   means for measuring a receive signal level at said base station when a mobile station has issued a call request;
   means for deciding a search start channel based on the measured receive signal level;
   means for specifying a single radio communication channel by sequentially searching a plurality of radio communication channels, starting with a decided search start channel, being a starting point;
   means for evaluating a communication quality of a specified radio communication channel;
   means for allowing repetition of the search and communication quality evaluation while advancing said starting point to the subsequent radio communication channel until evaluation result equals or exceeds a predetermined value;
   means for allowing initiation of radio communication between said mobile station and said base station by way of a specified radio communication channel when said evaluation result equals or exceeds a predetermined value;
   means for storing an empirical information, representing an information on radio communication channels previously used for radio communication between a mobile station and a base station, and correspondingly associated with receive signal levels measured on those occasions; and
   means for updating said empirical information.

3. A radio communication system comprising:
   a mobile station which issues a call request in response to a user's operation;
   a base station; and
   a control station;
   said base station including:
   means for measuring a receive signal level at said base station when said mobile station has issued a call request;
   means for specifying a single radio communication channel by sequentially searching a plurality of radio communication channels, starting with a decided search start channel, being a starting point;

means for evaluating a communication quality of a specified radio communication channel;

means for allowing repetition of the search and communication quality evaluation while advancing said starting point to the subsequent radio communication channel until evaluation result equals or exceeds a predetermined value; and means for allowing initiation of radio communication between said mobile station and said base station by way of a specified radio communication channel when said evaluation result equals or exceeds a predetermined value;

said control station including:

means for deciding a search start channel based on said measured receive signal level;

means for storing an empirical information, representing an information on radio communication channels previously used for radio communication between a mobile station and a base station, and correspondingly associated with receive signal levels measured on those occasions; and means for updating said empirical information.

4. A method of channel allocation comprising the steps of:

measuring a receive signal level at a base station when a mobile station has issued a call request;

deciding a search start channel based on the measured receive signal level;

specifying a single radio communication channel by searching a plurality of radio communication channels, starting with a decided search start channel, being a starting point;

evaluating a communication quality of a specified radio communication channel;

allowing repetition of the search and communication quality evaluation while advancing said starting point to the subsequent radio communication channel until evaluation result equals or exceeds a predetermined value;

allowing initiation of radio communication between said mobile station and said base station by way of a specified radio communication channel when said evaluation result equals or exceeds a predetermined value;

storing an empirical information, representing an information on radio communication channels previously used for radio communication between a mobile station and a base station, and correspondingly associated with receive signal levels measured on those occasions; and updating said empirical information.

5. A method of channel allocation according to claim 4, wherein said communication quality evaluation is carried out by comparing a measured value of a ratio of carrier power to interference power with a reference value.

6. A method of channel allocation according to claim 5, wherein said measurement of a receive signal level at said base station is executed in a circuit for measuring a ratio of carrier power to interference power.

7. A method of channel allocation according to claim 4, wherein mobile station to base station communication and base station to mobile station communication are both subjected to said quality evaluation.

8. A method of channel allocation according to claim 4, wherein said empirical information is referred to when deciding a search start channel.

9. A method of channel allocation according to claim 8, wherein said empirical information which is referred to when deciding a search start channel undergoes a statistical application for each of radio communication channels, and wherein defined as a search start channel is a radio communication channel corresponding to, among the thus obtained results of statistical application, the result of statistical application closest to a measured receive signal level.

10. A method of channel allocation according to claim 4, wherein previously provided statistical information representing a relationship between radio communication channels and receive signal levels is referred to in deciding a search start channel.

11. A method of channel allocation according to claim 4, wherein margin information representing variance contained in measured receive signal levels is also used in deciding a search start channel.

* * * * *